(12) United States Patent
Shimizu et al.

(10) Patent No.: US 8,305,462 B2
(45) Date of Patent: Nov. 6, 2012

(54) IMAGE REPRODUCTION APPARATUS

(75) Inventors: Hiroshi Shimizu, Akishima (JP); Jun Muraki, Hamura (JP); Hiroyuki Hoshino, Ome (JP); Erina Ichikawa, Sagamihara (JP); Hiroyasu Katagawa, Fussa (JP)

(73) Assignee: Casio Computer Co., Ltd., Tokyo (JP)

( * ) Notice: Subject to any disclaimer, the term of this patent is extended or adjusted under 35 U.S.C. 154(b) by 491 days.

(21) Appl. No.: 12/544,244

(22) Filed: Aug. 20, 2009

(65) Prior Publication Data

US 2010/0053372 A1 Mar. 4, 2010

(30) Foreign Application Priority Data

Sep. 4, 2008 (JP) ................................. 2008-226884

(51) Int. Cl.
*H04N 5/76* (2006.01)
(52) U.S. Cl. .................. 348/231.3; 348/231.6
(58) Field of Classification Search ............... 348/231.3, 348/79
See application file for complete search history.

(56) References Cited

U.S. PATENT DOCUMENTS

| | | | | |
|---|---|---|---|---|
| 6,819,356 | B1* | 11/2004 | Yumoto | 348/231.2 |
| 7,990,455 | B2* | 8/2011 | Iga | 348/333.02 |
| 2002/0191087 | A1* | 12/2002 | Hashimoto et al. | 348/231.3 |
| 2004/0201740 | A1* | 10/2004 | Nakamura et al. | 348/231.3 |
| 2006/0059093 | A1* | 3/2006 | Takaragi et al. | 705/51 |
| 2006/0152582 | A1* | 7/2006 | Uchida | 348/79 |
| 2009/0322904 | A1* | 12/2009 | Takahashi | 348/231.3 |
| 2011/0254978 | A1* | 10/2011 | Yamaji | 348/231.3 |

FOREIGN PATENT DOCUMENTS

| | | |
|---|---|---|
| CN | 1699924 A | 11/2005 |
| JP | 11-296276 A | 10/1999 |
| JP | 2004-56627 A | 2/2004 |
| JP | 2005-198038 A | 7/2005 |
| JP | 2006-287514 A | 10/2006 |
| WO | WO2008010575 * | 1/2008 |

OTHER PUBLICATIONS

Chinese Office Action dated May 19, 2011 (and English translation thereof) in counterpart Chinese Application No. 200910168673.7.
Chinese Office Action dated May 19, 2011 (and complete English translation thereof) in counterpart Chinese Application No. 200910168673.7.

* cited by examiner

*Primary Examiner* — Sinh Tran
*Assistant Examiner* — Christopher K Peterson
(74) *Attorney, Agent, or Firm* — Holtz, Holtz, Goodman & Chick, PC

(57) ABSTRACT

An image capturing apparatus 100 comprising a built-in memory 8 which stores a plurality of images captured by an image capturing unit 1 and a system file F2 that registers reproduction control information involving a position where reproduction of each of the images by a display 5 is permitted or prohibited, a GPS unit 2 to position the current position of the image capturing apparatus, and a CPU 9 which compares the positioned current position of the image capturing apparatus with the reproduction control information registered in the system file to control reproduction of the image by the display.

8 Claims, 12 Drawing Sheets

|  | SPOT A | SPOT B | SPOT C | ... |
|---|---|---|---|---|
| CIMG0001.JPG | ○ | ○ | × | ... |
| CIMG0002.JPG | × | ● | × | ... |
| CIMG0003.JPG | × | ○ | × | ... |
| CIMG0004.JPG | ○ | × | × | ... |
| ⋮ | ⋮ | ⋮ | ⋮ | ⋮ |

|  | SPOT A | SPOT B | SPOT C | CURRENT POSITION IS UNCLEAR | ... |
|---|---|---|---|---|---|
| CIMG0001.JPG | ○ | ○ | × | ○ | ... |
| CIMG0002.JPG | × | ● | × | × | ... |
| CIMG0003.JPG | × | ○ | × | × | ... |
| CIMG0004.JPG | ○ | × | × | × | ... |
| ⋮ | ⋮ | ⋮ | ⋮ | ⋮ | ⋮ |

IMAGE REPRODUCTION APPARATUS

CROSS-REFERENCE TO RELATED APPLICATION

This application is based upon and claims the benefit of priority from the prior Japanese Patent Application No. 2008-226884, filed Sep. 4, 2008, the entire contents of which are incorporated herein by reference.

BACKGROUND OF THE INVENTION

1. Field of the Invention

The present invention relates to apparatus for reproducing an image of a subject captured by a camera.

2. Description of the Related Art

In the past, there are known digital cameras which reproduce and display an image indicated by a user from among a plurality of images of subjects captured and stored.

There are also known digital cameras of another type in which captured image data on subjects are stored in association with their positions where the images are captured such that only when the position of an image to be reproduced matches a position where the image is captured, the image is reproduced.

Further, there are also known digital cameras of a different type in which only users meeting specified conditions in a specified place are allowed to capture an image of a subject in that place, and other persons are prohibited from capturing an image of the subject, for example, as disclosed in JP 2004-56627.

As disclosed in the '627, acquisition of images to be reproduced can be restrained by restraining the image capturing. Hence, it is considered that reproduction of images can be controlled indirectly.

With the camera which has no function of prohibiting reproduction of an image, captured in one place, in another place, there is a possibility that privacy of people whose image is captured privately in a private space will leak out, for example, due to inadvertent reproduction of the image, in an office where the user works.

As described above, when image reproduction is controlled in a state where the positions where the images are reproduced are associated respectively with the positions where the images are captured, the number of places where the images can be reproduced is restricted. Thus, there is the problem that the digital camera is inconvenient to use.

It is therefore an object of the present invention to provide a user-friendly image reproduction apparatus, an image capturing apparatus and a program each capable of controlling image reproduction properly at a reproduction position.

SUMMARY OF THE INVENTION

In order to achieve the above object, one aspect of the present invention provides an image reproduction apparatus comprising: an image storage unit that stores a plurality of captured images; reproduction means for reproducing a respective one of the plurality of images stored in the image storage unit; registration means for optionally registering thereon a position where reproduction of each of the plurality of images stored in the image storage unit is prohibited or permitted; a positioning unit that positions a current position of the image reproduction apparatus; and reproduction control means for comparing the current position of the image reproduction apparatus positioned by the positioning unit with a respective one of the positions registered on the registration means to control reproduction of the image by the reproduction means.

Another aspect of the present invention is to provide an image reproduction apparatus comprising: an image storage unit that stores a plurality of captured images; reproduction means for reproducing a respective one of the plurality of images stored in the image storage unit; registration means for registering thereon a plurality of different positions where reproduction of each of the plurality of images stored in the image storage unit is prohibited or permitted; a positioning unit that positions a current position of the image reproduction apparatus; and reproduction control means for comparing the current position of the image reproduction apparatus positioned by the positioning unit with a respective one of the positions registered on the registering means to control reproduction of the image by the reproduction means.

A further aspect of the present invention is to provide an image reproduction apparatus comprising: an image storage unit that stores a plurality of captured images; reproduction means for reproducing a respective one of the plurality of images stored in the image storage unit; registration means for optionally selecting an image, reproduction of which should be permitted or prohibited at a predetermined position, from among the plurality of images stored in the image storage unit and for registering the image thereon; a positioning unit that positions a current position of the image reproduction apparatus; and reproduction control means for comparing the current position of the image reproduction apparatus positioned by the positioning unit with a respective one of the positions registered on the registering means to control reproduction of the image by the reproduction means.

BRIEF DESCRIPTION OF THE DRAWINGS

The accompanying drawings, which are incorporated in and constitute a part of the specification, illustrate presently preferred embodiments of the present invention and, together with the general description given above and the detailed description of the preferred embodiments given below, serve to explain the principles of the present invention in which:

FIG. 2 schematically illustrates one example of a system file stored in a built-in memory of the image capturing apparatus of FIG. 1.

FIG. 9 schematically illustrates one example of a system file stored in a built-in memory of the image capturing apparatus of FIG. 8.

DETAILED DESCRIPTION OF THE PREFERRED EMBODIMENTS

Referring to the accompanying drawings, preferred embodiments of the present invention will be described.

(Embodiment 1)

Figure 1:
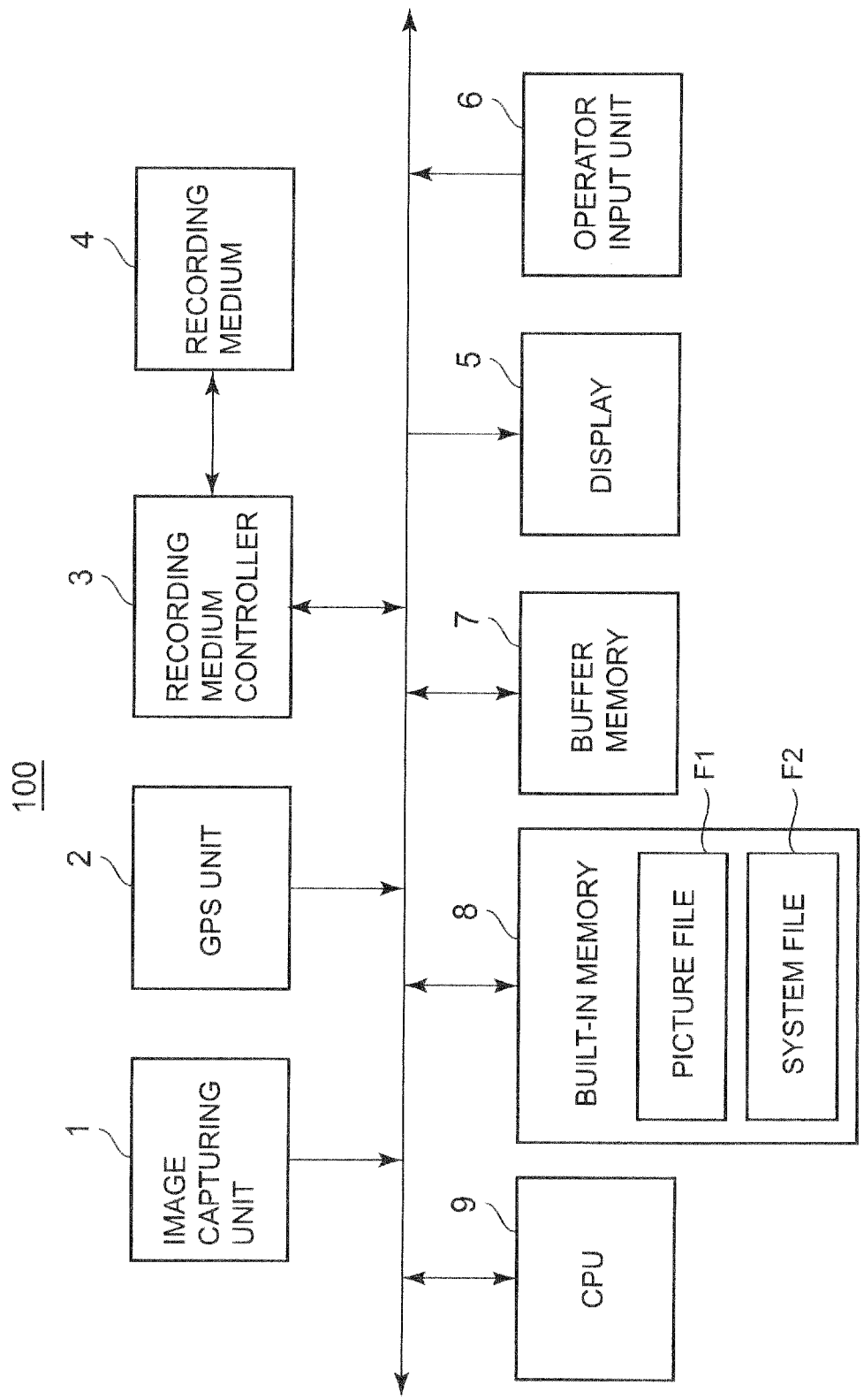
FIG. 1 is a block diagram indicative of a schematic configuration of an image capturing apparatus of an embodiment 1 according to the present invention.

FIG. 1 is a block diagram schematically illustrating image capturing apparatus (image reproduction apparatus) 100 as embodiment 1 according to the present invention. Image capturing apparatus 100 compares its current position positioned by a GPS unit 2 with reproduction control information, which will be described in detail later, for each of a plurality of images to control reproduction of that image by a display 5.

As shown in FIG. 1, image capturing apparatus 100 includes an image capturing unit 1, a GPS unit 2, a recording medium controller 3, a recording medium 4, a display 5, an operator input unit 6, a buffer memory 7, a built-in memory 8 and a CPU 9.

Image capturing unit 1 captures an image of a subject and produces a frame image. More specifically, although not shown, the image capturing unit 1 includes an electronic image capturing subunit which in turn, for example, includes an image capturing lens and a CCD (Charge Coupled Device) or CMOS (Complementary Metal-oxide Semiconductor) which converts the image of the subject, which has passed through the image capturing lens, to a 2-dimensional image signal; and an image capturing controller which controls the electronic image capturing subunit, and performs AE (Automatic Exposure), AF (Auto-focus) and AWB (Automatic White Balancing) functions.

The image capturing controller causes the electronic image capturing subunit to capture an image of the subject in a predetermined exposure time, and then reads a frame image from an image capturing area of the electronic image capturing subunit. Then, the image capturing controller transfers the read frame image to buffer memory 7.

When a live view image is displayed in the image capturing process, image capturing unit 1 successively captures images of the subjects at a predetermined frame rate to sequentially produce frame images for display of live view images.

GPS unit 2 positions a current position of the apparatus as positioning means. Although not shown, GPS unit 2 includes, for example, a GPS antenna and a positioning unit. The GPS antenna receives GPS signals from a plurality of GPS satellites launched into lower orbits around the Earth and outputs the received GPS signals to the positioning unit.

The positioning unit positions a current absolute 2-dimensional position (latitude, longitude) of image capturing apparatus 100 based on the GPS signals output from the GPS antenna.

Recording medium controller 3 controls storage of image files F1 on recording medium 4 and reading of a image file F1 from recording medium 4.

Recording medium 4 includes a card type non-volatile memory (flash memory) or a hard disk, for example.

Although not shown, display 5 includes, for example, an image display unit of liquid crystal and a display controller which controls display of a frame image on the display unit. When an image capturing mode is set, display 5 displays as a live view image frame images captured by image capturing unit 1 in a sequentially updated manner at the predetermined frame rate.

When an image reproduce mode is set, display 5 reproduces and displays an image based on an image file F1 read from the flash memory or the like.

Operator input unit 6 is used to operate image capturing unit 100. To this end, although not shown, operator input unit 6 includes a shutter button which instructs CPU 9 to record an image of a subject captured by image capturing unit 1, a set of upper and lower right and left cursor buttons which select one of several operational modes and/or one of several items, a decision button which instructs CPU 9 to decide an operational mode or an item selected by one of the set of cursor buttons.

The operational modes include, for example, a stationary image capture mode for capturing a stationary image of a subject, a moving image capture mode for capturing a moving image of the subject, and an image reproduce mode for reproducing one of the images stored in built-in memory 8 or on recording medium 4.

At operator input unit 6 the user operates the cursor and decision buttons on operator input unit 6 in an image registration process to be described later to specify, from among the plurality of images stored in built-in memory 8, a target image whose reproduction should be permitted or prohibited and a corresponding target position where the reproduction of the image should be permitted or prohibited (This position is hereinafter referred to as "reproduction control position").

In other words, the user operates operator input unit 6 to select and indicate one of image reproduction control (permission/prohibition) items, which can be hereinafter referred to as "reproduction control information): 1. "Reproduction of the target image is permitted only at the indicated position; 2. "Reproduction of the target image is prohibited only at the indicated position (or permitted at positions other than the indicated position)"; 3. "Reproduction of the target image is prohibited at the indicated position (or not necessarily permitted at positions other than the indicated position)"; and 4. "The target image is reproduced compulsively at the indicated position".

In the case of condition: 3. "Reproduction of the target image is prohibited at the specified position", whether reproduction of the target image should be permitted or prohibited at positions other than the specified position may be controlled depending on other conditions than positions.

The operator input unit 6 composes registration input means to perform the registration operation.

Buffer memory 7 includes, for example, a flash memory and temporarily stores data to be processed by CPU 9.

CPU 9 controls the respective components concerned of image capturing apparatus 100. More specifically, CPU 9 performs various control operations in accordance with respective processing programs for image capturing apparatus 100 stored in a program memory (to be described later) of built-in memory 8.

Built-in memory 8 stores a plurality of images files F1 for captured images of subjects as image storage means. Image file F1 may be stored on recording medium 4 as image storage means.

Built-in memory 8 also stores a system file F2 for reproduction control of image data. System file 2 contains reproduction control (or permission/prohibition) information where each of the plurality of images is associated with a reproduction-permitted position, a reproduction-compulsive position and a reproduction-prohibited position.

More specifically, as shown in FIG. 2, system file F2 records, in a list form, relationship between the plurality of images and the plurality of items of position information in which reproduction of an image should be permitted at a respective position (○: reproduction-permitted position), an image should be compulsively reproduced (●: reproduction compulsive position) or reproduction of an image should be prohibited (×: reproduction-prohibited position).

For example, at spot A, reproduction of each of images indicated by CIMG0001. JPG and CIMG0004. JPG is permitted ("○"), and reproduction of each of images indicated by CIMG0002. JPG and CIMG0003. JPG is prohibited ("×"). At spot B, reproduction of each of images indicated by CIMG0001. JPG and CIMG0003. JPG is permitted ("○"); and reproduction of image indicated by CIMG0002. JPG is compulsive ("●"); and reproduction of image indicated by CIMG0004. JPG is prohibited ("×"). At spot C, reproduction of each of images indicated by CIMG0001. JPG-CIMG0004. JPG is prohibited ("×"). Like this, registered in system file F2 are the plurality of images and the plurality of spots (A, B, C, . . . ) such that reproduction of each of the images is permitted or prohibited at a respective one of the plurality of predetermined spots.

Built-in memory 8 functions as registration means which registers reproduction control information on the plurality of images and their reproduction-permitted, -prohibited and -compulsive positions.

The reproduction-permitted, -prohibited and -compulsive positions may be defined strictly based on an absolute 2-dimensional position of image capturing apparatus 100, or otherwise may be defined as a circular area having a predetermined radius with the center coinciding with that of a user's house or firm, a nearby station, a movie theater, or the like.

Built-in memory 8 also includes a program memory which stores a program and data required for operation of CPU 9. The program contains a registration control routine, a reproduction control routine, a registered content changing routine. The "routine" referred to herein refers to a series of instructions having specified functions and composes a part of the computer program.

The registration control routine is a part of the program which causes CPU 9 to function as registration means. The registration control routine contains a group of instructions which cause CPU 9 to execute a registration control process which registers reproduction control information on reproduction-permitted, -prohibited and -compulsive positions for a respective one of the plurality of images in built-in memory 8.

More specifically, in the registration control routine, CPU 9 registers in system file F2 of built-in memory 8 the current position of the image capturing apparatus when the registration operation of the reproduction control position has been performed and/or the already registered positions which do not necessarily include the current position of the apparatus, as reproduction-permitted, -prohibited or -compulsive position, for the image specified at operator input unit 6.

When in the reproduction and display of an image the user operates operator input unit 6 to perform a registration operation which registers reproduction control positions, CPU 9 registers the image under reproduction in correspondence to the respective reproduction control positions in system file F2 of built-in memory 8.

In the reproduction and display of the image, the operator operates operator input unit 6 to cause CPU 9 to perform the registration operation to automatically register in system file F2 of built-in memory 8 the positioned current position of the image capturing apparatus, positioned by GPS unit 2, as a reproduction-permitted or -prohibited position for the image under reproduction.

The reproduction control routine is a part of the program which causes CPU 9 to function as reproduction control means. More specifically, the reproduction control routine includes instructions which cause CPU 9 to perform a reproduction control process, which includes comparing the current position of image capturing apparatus 100 positioned by GPS unit 2 with the reproduction control information registered in system file F2 of built-in memory 8, thereby controlling reproduction of an image on display 5.

More specifically, in the reproduction control routine, CPU 9 determines at which of the reproduction-permitted, -compulsive and -prohibited positions image capturing apparatus 100 is currently and then controls reproduction and display of the image on the display 5 in accordance with a result of the determination.

CPU 9 prohibits display 5 from reproducing an image for which the current position of the image capturing apparatus positioned by GPS unit 2 is registered as the reproduction-prohibited position, and permits display unit 5 to reproduce an image for which that position positioned by GPS unit 2 is registered as the reproduction-permitted position. Likewise, CPU 9 causes display unit 5 to compulsively reproduce an image for which the current position of the image capturing apparatus positioned by GPS unit 2 is registered as the reproduction-compulsive position.

The registered content changing routine is a part of the program which causes CPU 9 to function as registered content changing means. The content changing routine includes instructions which when an image is reproduced compulsively at the reproduction-compulsive position, causes CPU 9 to perform a registered content changing process which includes changing the reproduction-compulsive position registered in system file F2 to a reproduction-permitted position.

FIGS. 3, 4, 6-8 and 10-12 are correctively a flowchart indicative of the whole operation of image capturing apparatus 100 and also indicative of the structure of an algorism of the program stored in the program memory. While specified program codes actually used for CPU 9 are not described, they can be designed based on this flowchart.

Figure 3:
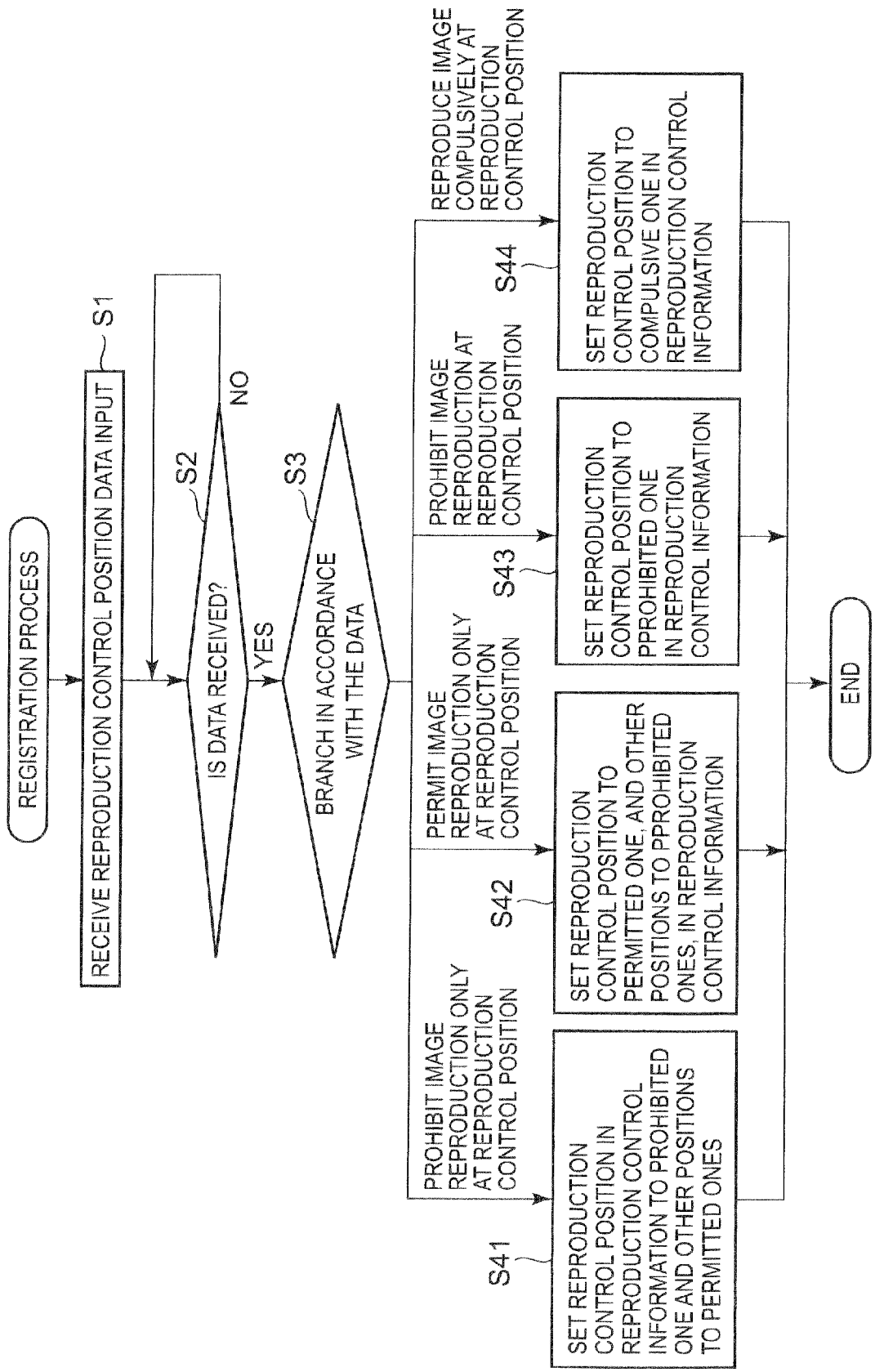
FIG. 3 is a flowchart indicative of one example of a registration process to be performed by the image capturing apparatus of FIG. 1.

Referring to FIG. 3, a registration process will be described. FIG. 3 is a flowchart indicative of one example of the registration process.

The registration process is executed when the registration mode is selected in a state in which a target image is displayed on display 6 in accordance with the user's operation of operator input unit 6.

When the registration process mode is selected, the registration control routine causes CPU 9 to receive information on a reproduction control position. More specifically, CPU 9 reads display control data involving a reproduction control position setting picture (not shown) from built-in memory 8 and then causes display 5 to display this picture based on the read display control data. Then, CPU 9 prompts the user to select one of the current position of the image capturing apparatus positioned by GPS unit 2 and the already registered position as the reproduction control position (step S1).

If the current position of the image capturing apparatus is not yet registered in system file F2 when this position is inputted as the reproduction control position, CPU 9 registers in system file F2 the current position of the image capturing apparatus inputted at operator input unit 6.

When the user inputs the reproduction control position at operator input unit 6 (YES in step S2), CPU 9 receives this input. More specifically, in response to the user's input operation, CPU 9 reads display control data involving a reproduction control content setting picture from built-in memory 8 and displays a corresponding picture on display 5 based on the read data.

CPU 9 then prompts the user to select one of items: 1. "Reproduction of a target image is permitted only at the reproduction control position"; 2. "Reproduction of a target image is prohibited only at the reproduction control position": 3. "Reproduction of a target image is prohibited only at the reproduction control position"; 4. "A target image is produced compulsively at the reproduction control position".

Then, CPU 9 receives the one selected item, and causes the processing to branch to an appropriate step in accordance with the selected item (step S3).

When in step S3, the item: 1. "Reproduction of the target image is permitted only at the reproduction control position" is selected, CPU 9 sets the reproduction control information on the appropriate image stored in system file F2 such that the reproduction control position is a reproduction-permitted position ("○") and that other reproduction control positions are the reproduction-prohibited positions ("×") (step S42).

When, in step S3, the item: 2. "Reproduction of the target image is prohibited only at the reproduction control position" is selected, CPU 9 sets the reproduction control information on the appropriate image stored in system file F2 such that the reproduction control position is the reproduction-prohibited position ("×") and that any position other than the reproduction-permitted position is the reproduction-permitted position ("○") (step S41).

When in step S3, item: 3. "Reproduction of the target image is prohibited at the reproduction control position" is selected, CPU 9 sets the reproduction control information on the appropriate image stored in system file F2 such that the reproduction control position is a reproduction-prohibited position ("×") (step S43).

When in step S3, item: 4. "The target image is reproduced compulsively at the reproduction control position" is selected, CPU 9 sets the reproduction control information on the appropriate image in system file F2 such that the reproduction control position is a reproduction-compulsive position ("●") (step S44).

Next, an image reproduction process will be described with reference to a flowchart of FIG. 4. In this process, the plurality of images stored in built-in memory 8 or on recording medium 4 are sequentially read out and displayed at predetermined intervals of time.

The image reproduction process is performed when the image reproduction mode is selected at operator input unit 6.

When the image reproduction mode is selected, the reproduction control routine causes GPS unit 2 to position the current position of image capturing apparatus 100 under control of CPU 9 and produces the current position data on the image capturing apparatus (step S51).

Subsequently, CPU 9 reads reproduction control information from system file F2 (step S52), and then detects the content of reproduction control put in correspondence to the current position of image capturing apparatus 100 based on its current position data acquired by GPS unit 2 (step S53).

Then, CPU 9 determines whether there is an image for which the current position of the image capturing apparatus 100 is registered as the reproduction-compulsive position of that image (step S54).

For example, when the current position of the image capturing apparatus is spot A, CPU 9 determines in step S54 that there is no image to be reproduced compulsively (NO in step S54) because there is no image for which the current position of the image capturing apparatus is set as the reproduction-compulsive position (NO in step S54). Then, CPU 9 causes its processing to branch to an appropriate step in accordance with the reproduction control content for first image file F1 (indicated by CIMG0001. JPG) (step S55).

When the current position of the image capturing apparatus is the reproduction-permitted position ("permit" in step S55), CPU 9 reads image file F1 from built-in memory 8, produces corresponding image data of YUV type, converts its resolution as required and then reproduces and displays it on display 5 (step S56). If, for example, the current position of the image capturing apparatus is spot A, CPU 9 shifts its processing to step S56 and then reproduces and displays the CIMH0001. JPG image on display 5 because spot A is registered as the reproduction-permitted position.

Then, CPU 9 changes the image to be reproduced to a next image indicated by CIMG0002. JPG in an appropriate one of the plurality of image files F1 stored in built-in memory 8 (step S57).

If the current position of the image capturing apparatus is the reproduction-prohibited position ("prohibit" in step S55), CPU 9 shifts its processing to step S57, thereby repeatedly performing step S57 and subsequent steps.

When, for example, the current position of the image capturing apparatus is spot B, this spot B is the reproduction-compulsive position for the CIMG0002. JPG image. Thus, CPU 9 determines in step S54 that there is an image to be reproduced compulsively (YES in step S54), reads image file F1 (indicated by CIMG0002. JPG) where spot B is the reproduction-compulsive position, produces corresponding image data of YUV type, performs a resolution conversion process as required, and then reproduces and displays a resulting image on display 5 (step S58).

Then, in the registered content changing routine, CPU 9 changes the reproduction-compulsive position to a reproduction-permitted position in the reproduction control information registered in system file F2 (step S59), returns its process to step S54, and then repeats step S54 and subsequent steps.

Figure 4:
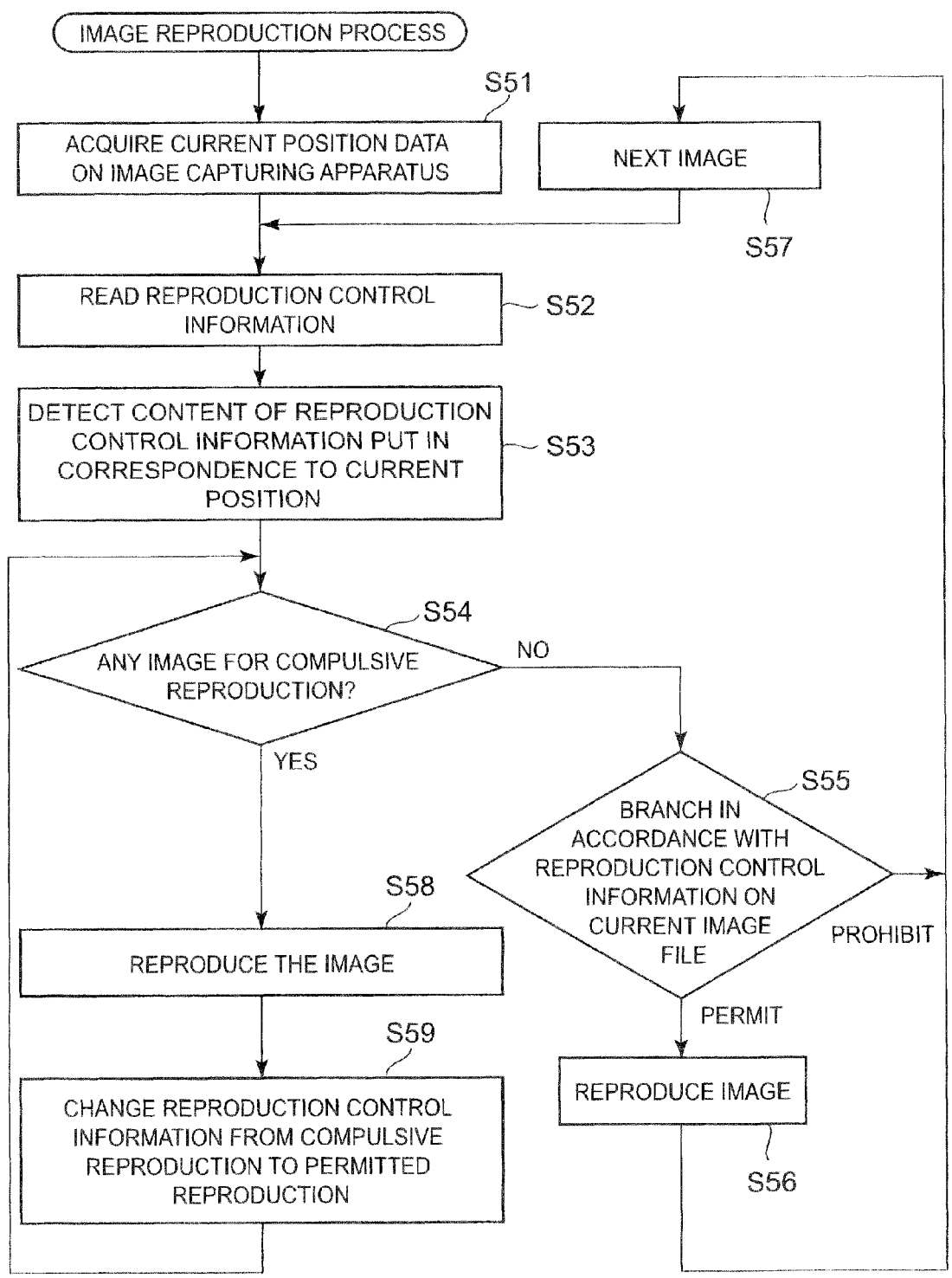
FIG. 4 is a flowchart indicative of one example of an image reproduction process to be performed by the image capturing apparatus of FIG. 1.
Figure 5:
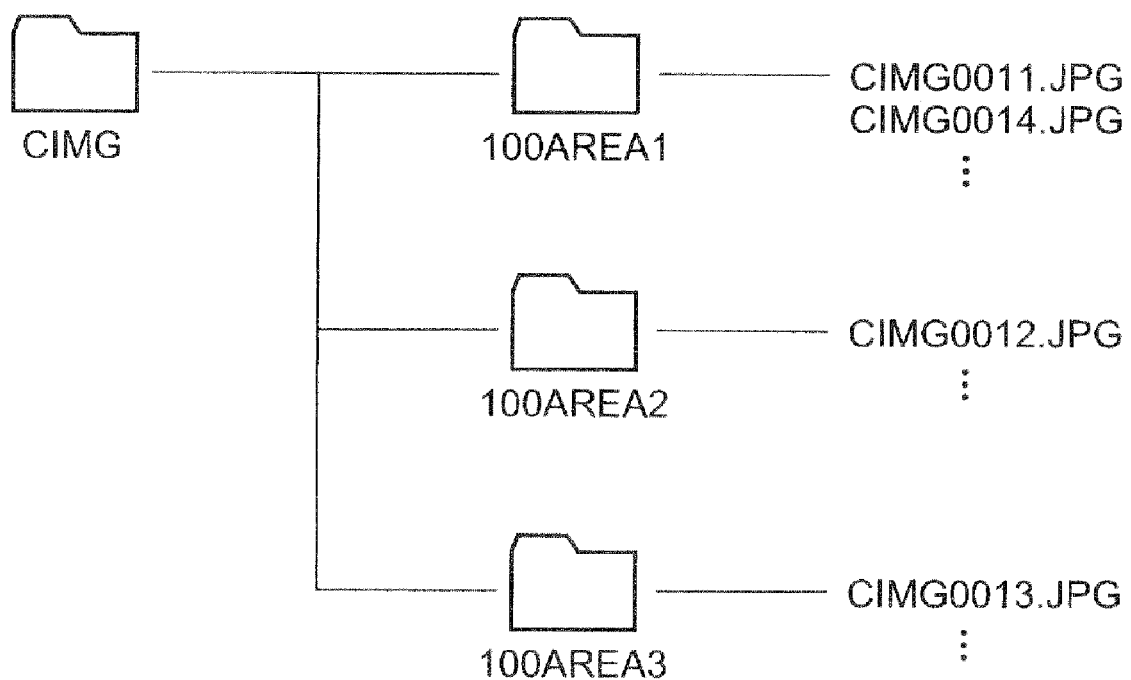
FIG. 5 schematically illustrates one example of the structure of a folder stored in the built-in memory of the image capturing apparatus of FIG. 1.

When the current position of the image capturing apparatus positioned in step S51 of FIG. 4 is, for example, spot C, there are no images reproduced and displayed on display 5 because any of images indicated by CIMG0001. JPG, CIMG0002. JPG, CIMG0003. JPG and CIMG0004. JPG is registered as being at the reproduction-prohibited position. In such a case, display 5 may display a message such as, for example, "There are no images to be reproduced at the current position of the image capturing apparatus".

Thus, even when there are no images to be reproduced at the current position of the image capturing apparatus, the fact that image files F1 are stored in built-in memory 8 can be reported to the user, thereby preventing the user from misunderstanding that there are no image files F1 stored.

While in embodiment 1 the reproduction control information is illustrated as stored in system file F2, the reproduction-permitted and -prohibited positions may be stored in a user area of each image file F1. In the image reproduction process, the reproduction control information stored in image file F1 may be read in step S.52 of FIG. 4.

Thus, even when image file F1 is moved to an image capturing apparatus, reproduction control may be performed based on the reproduction control information stored in image file F1.

While in embodiment 1 the reproduction control information is illustrated as registered in each image file F1, it may be registered in each of folders (for example, 100AREA1, 100AREA2, 100AREA3, . . . ) which store a plurality of image files F1. Thus, no reproduction control information need to be registered in each of the plurality of image files F1, and management of the reproduction control information is facilitated, thereby improving the efficiency of determining the reproduction control information.

(Embodiment 2)

An image capturing apparatus of embodiment 2 will be described with reference to FIG. 6. As shown, when the plurality of image files F1 include reproduction-prohibited images in package deletion of all the image files F1, a deletion restraint process is performed which includes restraining package deletion of all the files and gives an advance warning of this deletion. This image capturing apparatus is similar in configuration to that of embodiment 1 and further description thereof will be omitted.

A program stored in the program memory includes a deleted-image determination routine and a deletion restraint routine. The deleted-image determination routine is a part of the program which causes CPU 9 to function as deleted-image determination means.

This routine includes a group of instructions which, when CPU 9 is instructed to perform package deletion of the plurality of image files F1 stored in built-in memory 8 based on the operation of an all-image deletion key (not shown) of operator input unit 6, causes CPU 9 to perform a deleted-image determination process to determine whether the plurality of image files F1 for the package deletion contains a reproduction-prohibited image stored in built-in memory 8 for which image the current position of the image capturing apparatus positioned by GPS unit 2 is registered as a reproduction-prohibited position.

The deletion restraint routine is a part of the program which causes CPU 9 to function as deletion restraint means. This routine includes instructions which, when CPU 9 determines that the reproduction-prohibited image is included in the image files F1 in the deleted-image determination process, causes CPU 9 to perform a process for restraining the package deletion of the plurality of image files F1.

More specifically, this routine causes CPU 9 to stop package deletion of the image files or otherwise to display an advance warning (not shown) such as, for example, "Image files which cannot be reproduced at the current position of the image capturing apparatus will also be erased" on display 5 before the package deletion of the image files.

Figure 6:
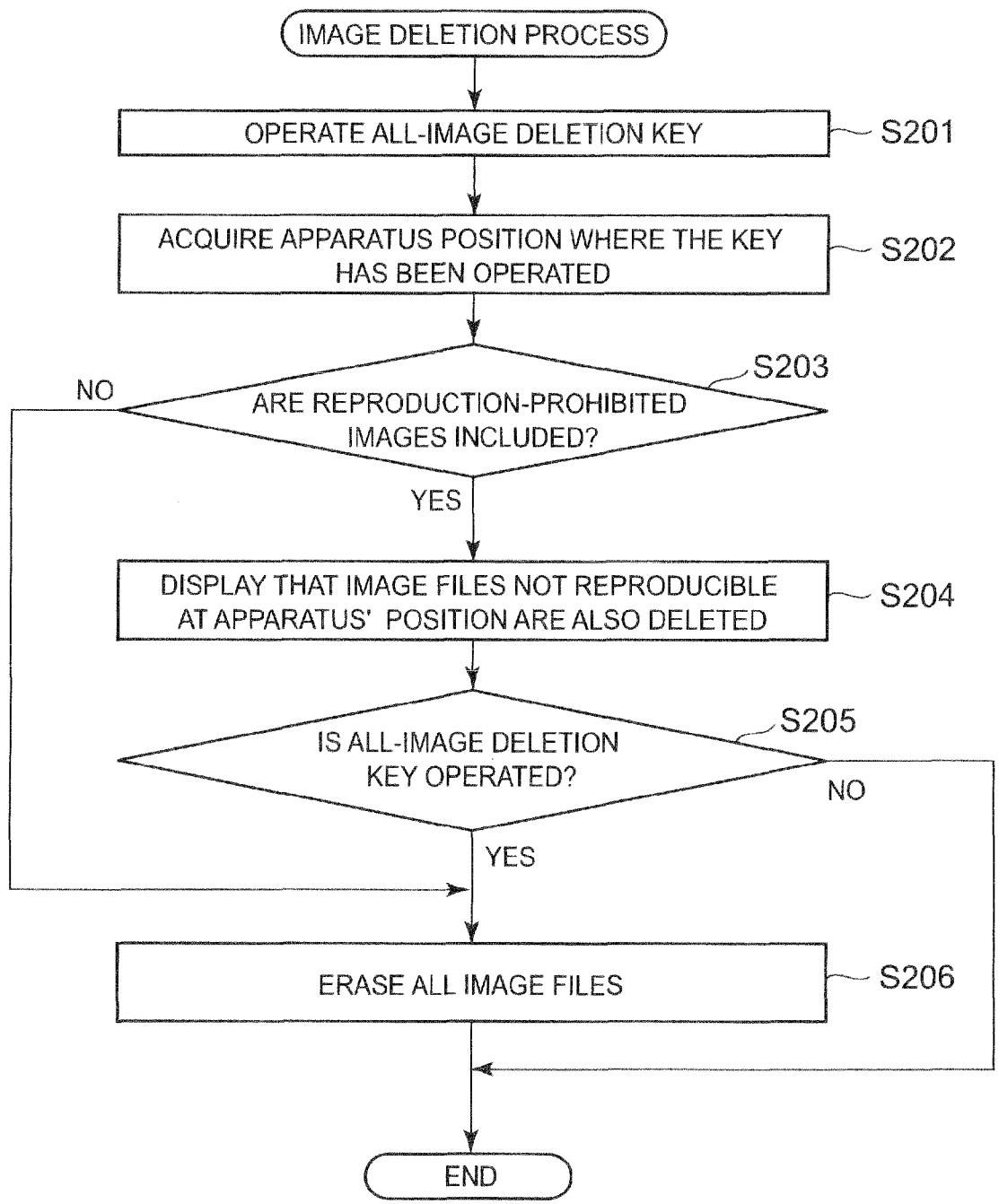
FIG. 6 is a flowchart indicative of one example of an image deletion process to be performed by an image capturing apparatus of an embodiment 2 according to the present invention.

Referring to FIG. 6, an image deletion process will be described. FIG. 6 is a flowchart of the image deletion process.

This process is performed when an image deletion mode is selected by the user's operation at operator input unit 6. When the user instructs CPU 9 to perform package deletion of all the image files F1 stored in built-in memory 8 by operating the all-image deletion key of operator input unit 6 (step S201), GPS unit 2 positions the position of the image capturing apparatus when the user instructed CPU 9 to perform package deletion of the files, and produces and acquires corresponding position data (step S202).

Then, the deleted-image determination routine causes CPU 9 to perform a deleted-image determination process which includes determining whether the plurality of image files F1 for the package deletion contains a reproduction-prohibited image registered in built-in memory 8 for which image the position of the image capturing apparatus positioned by GPS unit 2 when CPU 9 was instructed to perform the package deletion of those image files is set as a reproduction-prohibited position (step S203).

If so (YES in step S203), the deletion restraint routine causes CPU 9 to read display control data for a warning picture from built-in memory 8 and display on display 5 the warning picture with a warning, for example, of "Image files F1 which cannot be reproduced at the current position of the image capturing apparatus also will be erased" based on the display control data read from built-in memory 8 (step S204).

Then, CPU 9 determines whether the user has operated the all-image deletion key of operator input unit 6 (step S205). If so (YES in step S205), CPU 9 erases all the image files F1 stored in built-in memory 8 (step S206). If not in step S203, CPU 9 shifts its processing to step S206 and then performs step S206 and subsequent steps.

When in step S205, CPU 9 determines that no all-image deletion key is operated, then CPU 9 terminates the image deletion process.

While in embodiment 2 it is illustrated that the predetermined warning picture is displayed (step S204) when the reproduction-prohibited image is contained in the image files F1 for the package deletion (YES in step S203), images other than the reproduction-prohibited image may be deleted instead.

Thus, the reproduction-prohibited image is maintained without being deleted automatically in the package deletion process, thereby improving the convenience of the package deletion process.

In embodiment 2, it is illustrated that when the user operates the all-image deletion key (YES in step S205) after the predetermined warning pictured is displayed (step S204), all the image files F1 are erased (step S206) and that when the all-image deletion key is not operated (NO in step S205), none of all the image files F1 is erased. Alternatively, the processing may branch to an appropriate step in accordance with the image for deletion specified by the user after display of the warning picture.

Figure 7:
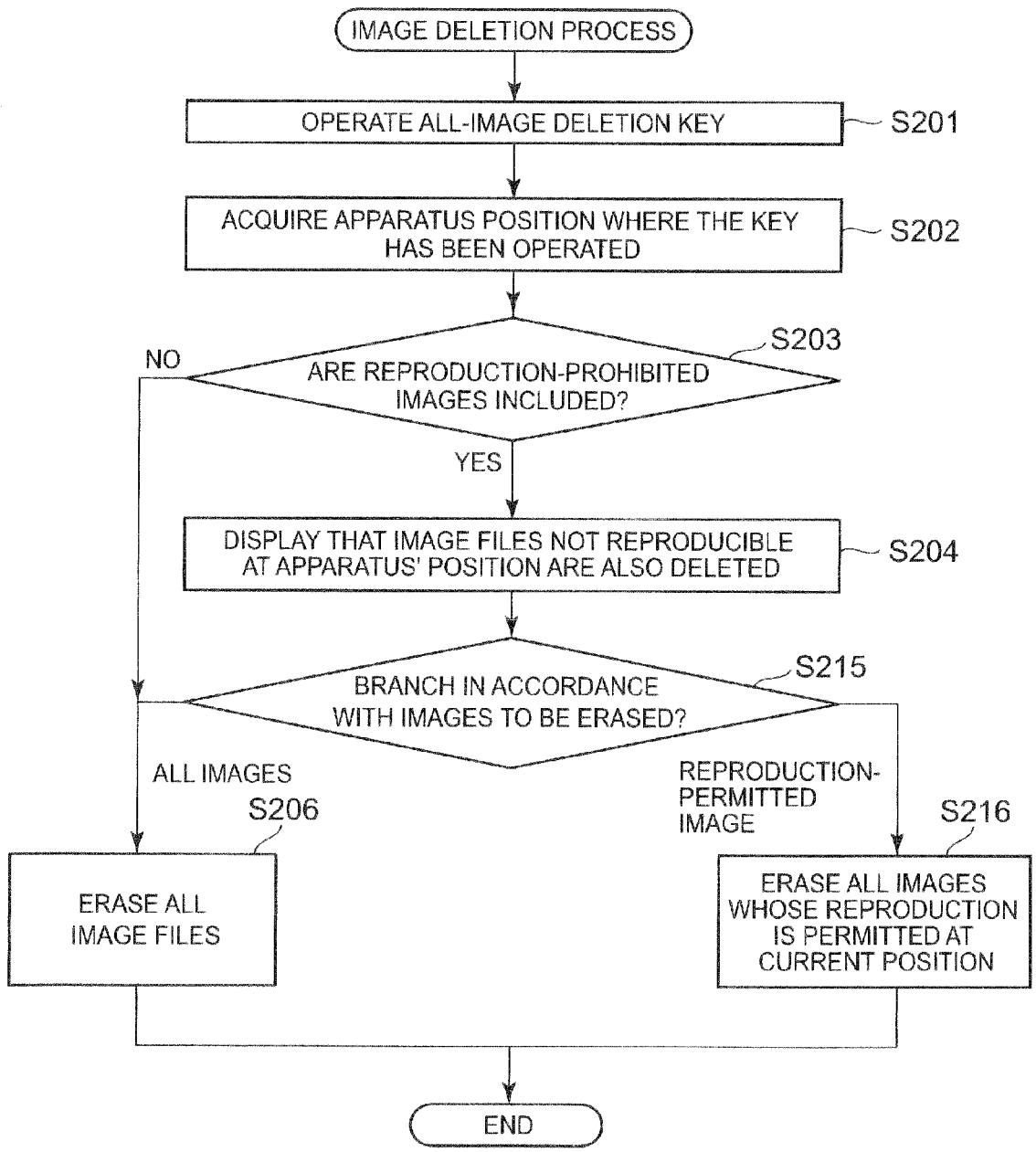
FIG. 7 is a flowchart indicative of another example of the image deletion process to be performed by the image capturing apparatus of FIG. 6.

More particularly, as shown in FIG. 7, after display of the predetermined warning picture (step S204), CPU 9 reads display control data on a picture for selecting images for deleting purpose from built-in memory 8, displays the picture based on the read display control data, and causes the processing to branch to the appropriate step in accordance with the images selected by the user for erasing purpose (step S215).

For example, when deletion of all the image files F1 stored in built-in memory 8 is selected (step S215), CPU 9 erases all the image files F1 (step S206).

When deletion of the images for which the position of the image capturing apparatus positioned when the deletion operation was performed is the reproduction-permitted position is selected (step S215), CPU 9 refers to system file F2 stored in built-in memory 8 and deletes only reproduction-permitted images registered in built-in memory 8 for which image that position of the image deletion operation is set as the reproduction-permitted position (step S216).

This not only prevents wrong deletion of image files F1 which cannot be reproduced and displayed at the deletion operation position and whose content cannot be ascertained, but also can on the spot perform package deletion of image files F1 whose content is unnecessary to ascertain. Thus, the convenience of the package deletion process and the handiness of the image capturing apparatus are improved.

(Embodiment 3)

Figure 8:
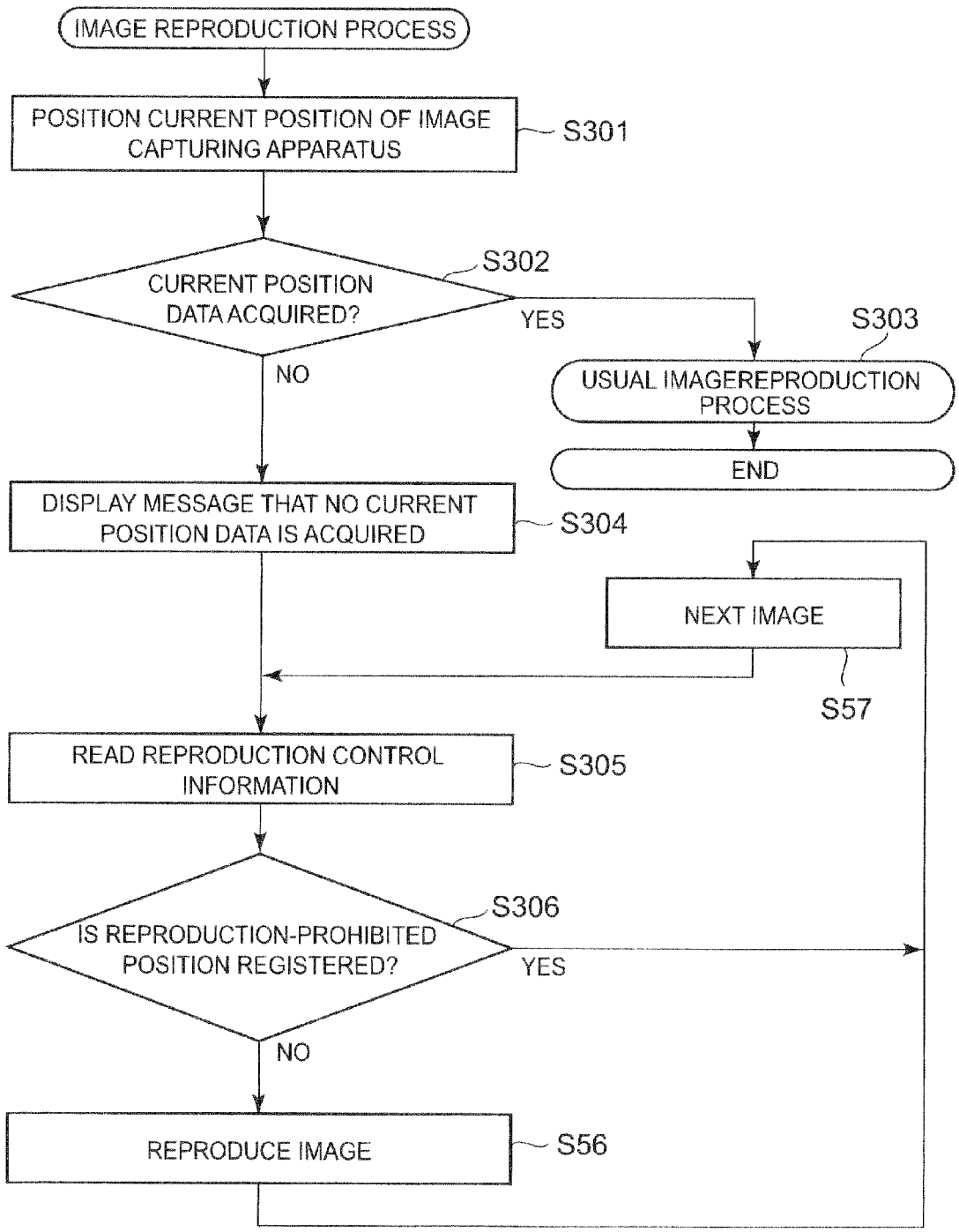
FIG. 8 is a flowchart indicative of one example of an image reproduction process to be performed by an image capturing apparatus of an embodiment 3 according to the present invention.

Referring to FIG. 8, embodiment 3 of the image capturing apparatus will be described. As shown in FIG. 8, this image capturing apparatus performs a reproduction prohibition process which includes prohibiting reproduction of an image for which the reproduction-prohibited position is registered as reproduction control information when the current position of the image capturing apparatus cannot be positioned.

This image capturing device is similar in configuration to the image capturing apparatus 100 of embodiment 1 excluding the fact that the image capturing apparatus of embodiment 3 performs a reproduction prohibition process, and further description thereof will be omitted.

The program stored in the program memory includes a positioning determination routine and a reproduction prohibition routine.

The positioning determination routine is a part of the program which causes CPU 9 to function as positioning determination means. This routine includes a group of instructions which cause CPU 9 to perform a positioning determination process to determine whether the current position of the image capturing apparatus is positioned by GPS unit 2 and whether corresponding data is obtained.

The reproduction prohibition routine includes a group of instructions which when it is determined that the current position data on the image capturing apparatus has not been obtained in the positioning determination process, causes CPU 9 to perform a reproduction prohibition process which prohibits reproduction of an image for which the reproduction-prohibited position is registered as reproduction control information in system file F2 of built-in memory 8.

Referring to FIG. 8, an image reproduction process will be described. FIG. 8 is a flowchart of one example of the image reproduction process.

When an image reproduction mode is selected by the user at operator input unit 6, a reproduction control routine causes GPS unit 2 to measure the current position of the image capturing apparatus under control of CPU 9 (step S301).

Then, the positioning determination routine causes CPU 9 to determine whether the current position of the image capturing apparatus is positioned by GPS unit 2 and whether corresponding apparatus' current position data is obtained (step S302).

If so (YES in step S302), CPU 9 performs a usual image reproduction process similar to the image reproduction process shown in FIG. 4 (step S303).

When CPU 9 determines that the current position data cannot be obtained in step S302, CPU 9 reads display control data on a reporting picture from built-in memory 8 and causes display 5 to display the reporting picture with a message such as, for example, "No current position data on the image capturing apparatus cannot be obtained" (step S304).

Then, CPU 9 reads out from system file F2 reproduction control information put in correspondence to an image file F1 (for example, indicated by CIMG0001. JPG) to be reproduced and displayed first on display 5 (step S305).

The reproduction prohibiting routine causes CPU 9 to determine whether a reproduction-prohibited position is registered at any position in the read reproduction control information (step S306).

If not (NO in step S306), CPU 9 reads image file F1 from built-in memory 8, produces corresponding image data of YUV type, performs a resolution conversion process as required, and then reproduces and displays a resulting image on display 5 (step S56).

Then CPU 9 changes the image to be next reproduced to a next image (for example, indicated by CIMG0002. JPG) in an appropriate one of the plurality of image files F1 stored in built-in memory 8 (step S57).

When CPU 9 determines that the reproduction-prohibited position is registered in step S306, CPU 9 shifts the processing to step S57 without reading the appropriate image file F1 (for example, indicated by CIMG0001. JPG) involving the image reproduction and display, and then repeats step S57 and subsequent steps.

While in embodiment 3 it is illustrated that reproduction of the image for which the reproduction-prohibited position is registered is prohibited when the current position data on the image capturing apparatus cannot be obtained, the present invention is not limited to this particular case.

For example, as shown in FIG. 9, the content of a process to be performed when the current position data on the image capturing apparatus cannot be obtained, which implies that the current position of the image reproduction is unclear, may be beforehand recorded in system file F3 and then the image reproduction process may be controlled in accordance with the content of the process. Symbols "○", "×" and "●" in FIG. 9 are the same in implication as those in FIG. 2.

Thus, automatic reproduction and display of the image file F1 for which no reproduction-prohibited position is registered in system file F3 is prevented, thereby preventing leak of privacy appropriately.

(Embodiment 4)

Figure 10:
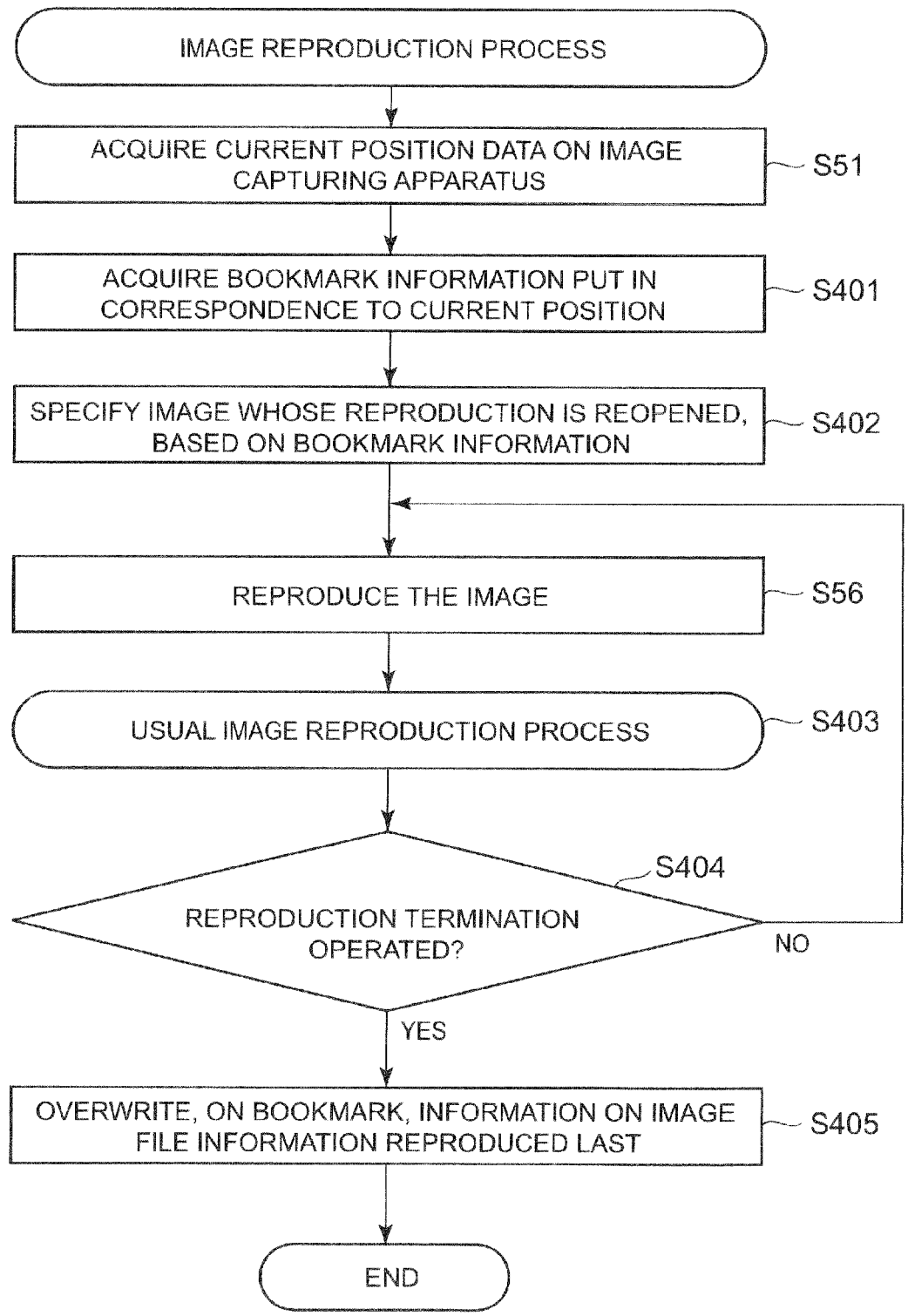
FIG. 10 is a flowchart indicative of one example of an image reproduction process to be performed by an image capturing apparatus of an embodiment 4 according to the present invention.

Referring to FIG. 10, an image capturing apparatus of embodiment 4 will be described. As shown in FIG. 10, this image capturing apparatus stores a plurality of items of "bookmark" information each indicative of a respective one of a plurality of images reproduced and displayed in a predetermined sequence. When requested, the image capturing apparatus performs a reopening control process which includes reproducing and displaying images, starting with the image indicated by a predetermined item of bookmark information, which will be described in more detail later.

The image capturing apparatus of embodiment 4 is similar in configuration to image capturing apparatus 100 of embodiment 1 excluding the fact that the former performs the reopening control process, and further description thereof will be omitted.

System file F2 stored in built-in memory 8 has stored at each of the reproduction control positions an item of bookmark information indicative of a respective one of the reproduced images among the plurality of images to be reproduced and displayed in a predetermined sequence. Built-in memory 8 composes bookmark storage means which stores bookmark information.

The program stored in the program memory includes a reopening control routine, which is a part of the program which causes CPU 9 to perform as reopening control means. The reopening control routine includes a group of instructions which causes CPU 9 to perform a reopening control process which includes reopening in a predetermined sequence the reproduction and display of images, starting with a reproduced image, indicated by the bookmark information stored in system file F2, in an appropriate one of the plurality of image files F1 stored in built-in memory 8.

More specifically, the reopening control routine causes CPU 9 to specify an item of bookmark information involving the current position of the image capturing apparatus positioned by GPS unit 2 among the plurality of items of bookmark information stored in system file F2, and then reopens reproduction of images in the predetermined sequence, starting with the image indicated by the item of bookmark information.

Referring to a flowchart of FIG. 10, the image reproduction process will be described. It is assumed that in the image reproduction process to be described below, system file F2 has stored at least one item of bookmark information, each to specify an image reproduced previously at a respective predetermined position (for example, spot A), in correspondence to the respective predetermined positions.

When the image reproduction mode is selected by the user at operator input unit 6, the reproduction control routine causes GPS unit 2 to position the current position (for example, spot A) of the image capturing apparatus under control of CPU 9, and then produces and acquires corresponding current position data (step S51).

Subsequently, the reopening control routine causes CPU 9 to acquire from system file F2 the item of bookmark information put in correspondence to the current position of the image capturing apparatus based on the current position data acquired by GPS unit 2 (step S401).

Then, CPU 9 specifies an image to be reproduced and displayed first after reopening of the reproduction of images based on the acquired bookmark information (step S402), reads image file F1 for the image to be reproduced from built-in memory 8, produces corresponding image data of YUV type, performs a resolution conversion process as required, and then reproduces and displays a resulting image on display 5 (step S56).

Then, CPU 9 performs a usual image reproduction process similar to the image reproduction process of FIG. 4 (step S403). The usual image reproduction process is repeated until CPU 9 is instructed to terminate the image reproduction process based on the user's operation at operator input unit (6 (NO in step S404).

When in response to terminating the usual reproducing process (YES in step S404), CPU 9 overwrites information to specify the image file F1 reproduced and displayed last in the usual reproducing process on the bookmark information used at the current position, thereby terminating this process (step S405).

When in embodiment 4 an image whose reproduction is prohibited at the reproduction reopening position is included in the plurality of images to be reproduced and displayed in the predetermined sequence, the reproduction and display of the image may be stopped or otherwise a warning that an image whose reproduction is prohibited is included in the plurality of images may be given.

The program stored in the program memory includes a reproduced image determination routine and a reopening restraint routine.

The reproduced-image determination routine is a part of the program which causes CPU 9 to function as reproduced-image determination means. This routine includes a group of instructions which when the reopening control routine reopens reproduction of images, causes CPU 9 to perform a reproduced-image determination process including determining whether the images to be reopened includes a reproduction-prohibited image for which the reproduction reopening position of the image capturing apparatus positioned by GPS unit 2 is registered as a reproduction-prohibited position in system file F2.

The reopening restraint routine causes CPU 9 to function as reopening restraint means. This routine includes a group of instructions which when the reproduced-image determination process determines that the images includes a reproduction-prohibited image, cause CPU 9 to perform a reopening restraining process which stops reproduction of that image or otherwise provides a warning that the plurality of images include a reproduction-prohibited image.

Then, after providing the warning, CPU 9 reproduces on display 5 the plurality of images excluding the reproduction-prohibited image in a predetermined sequence.

(Embodiment 5)

Figure 11:
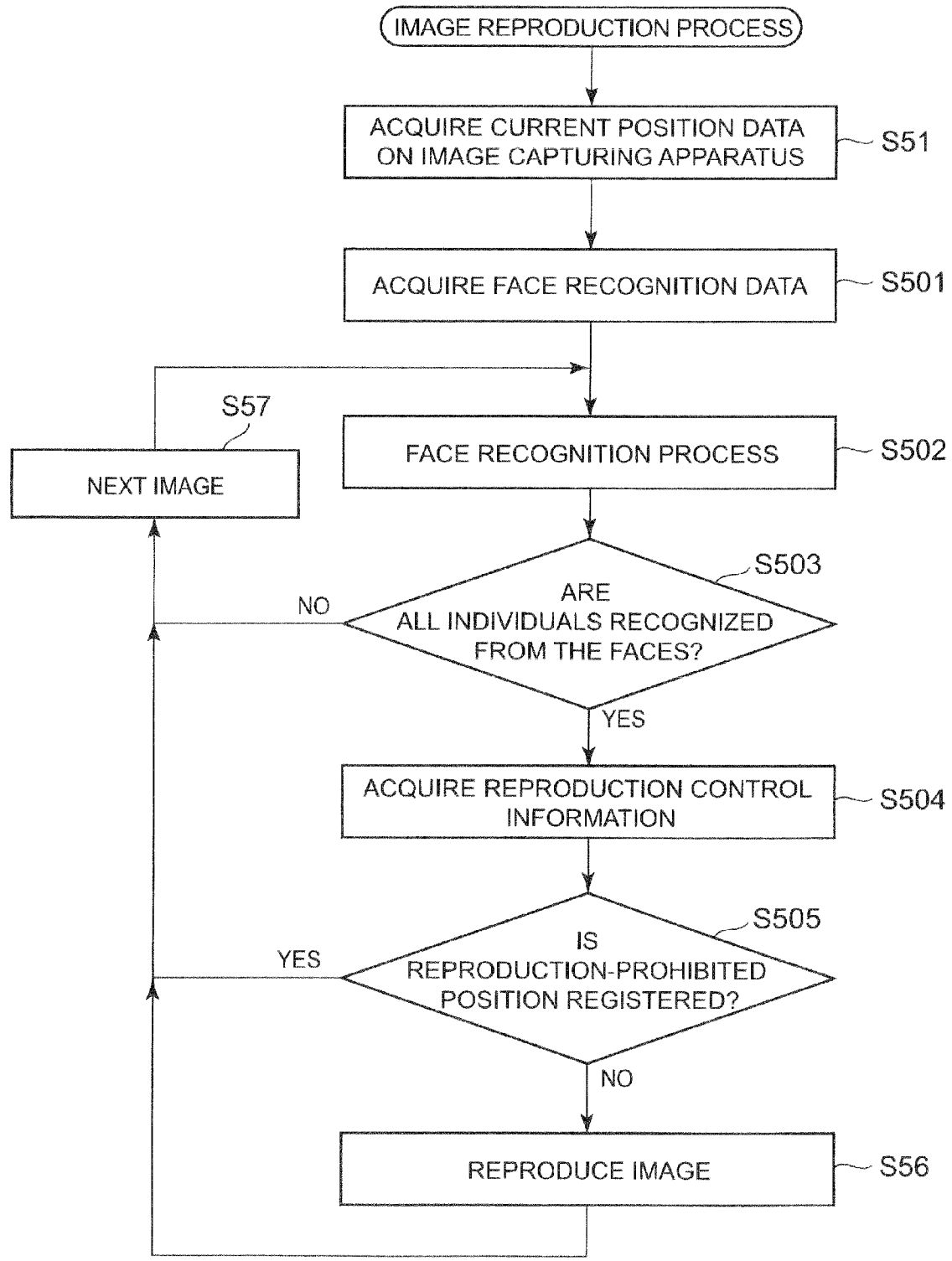
FIG. 11 is a flowchart indicative of one example of an image reproduction process to be performed by an image capturing apparatus of an embodiment 5 according to the present invention.

Referring to FIG. 11, an image capturing apparatus of this embodiment 5 will be described. As shown in FIG. 11, this image capturing apparatus performs a reproduction control process which controls reproduction and display of an image on display 5 based on the current position of the image capturing apparatus as basic conditions and other conditions including a result of a face recognition process.

This image capturing apparatus is similar in configuration to image capturing apparatus 100 of embodiment 1 excluding the reproduction control process based on the result of the face recognition, and further description thereof will be omitted.

Built-in memory 8 stores a face recognition file (not shown), which includes face recognition data used in the face recognition process, and put in correspondence to reproduction control information involving reproduction-permitted and -prohibited positions.

The face recognition data is information to specify each person's face. This information may be face image data captured from each person's face or data representing the features of that person's face.

The reproduction control routine includes a group of instructions which cause CPU 9 to perform a reproduction control process which controls reproduction of an image on display 5 based on the current position of the image capturing apparatus and a result of the face recognition process (which is other conditions than the positions).

More specifically, in the reproduction control routine, CPU 9 compares one of face images included in a frame image reproduced and displayed first with face recognition data included in the face recognition file.

When as a result of the comparison, CPU 9 determines that the face image matches any particular person's face registered in the face recognition data, CPU 9 determines whether the image at the current position of the image capturing apparatus positioned by GPS unit 2 is permitted to be reproduced and displayed based on the reproduction control information put in correspondence to the specified person's image in the face recognition data. Then, CPU 9 controls reproduction and display of the image on display 5 in accordance with a result of the determination.

Then, referring to FIG. 11, the image reproduction process will be described. FIG. 11 is a flowchart of one example of the reduction process.

When an image reproduction mode is selected in accordance with the user's operation at operator input unit 6, the reproduction control routine causes GPS unit 2 to position the current position (for example, spot A) of the image capturing apparatus under control of CPU 9, and produces and acquires corresponding position data (step S51).

Subsequently, the reproduction control routine causes CPU 9 to acquire face recognition data from the face recognition file stored in built-in memory 8 (step S501), detects face image data from the image displayed first in a predetermined face detection process, and compares the face image data with the face recognition data (step S502).

Then, CPU 9 determines whether respective persons are recognized or identified from all the face images detected in the frame image in the face detection process (step S503).

If not (NO in step S503), CPU 9 changes the image to be reproduced to a next image (for example, indicated by CIMG0002. JPG) in an appropriate one of the plurality of image files F1 stored in built-in memory 8 (step S57), shifts the processing to step S502, and then repeats step S502 and subsequent steps.

If CPU 9 determines that in step S503 all the face images in the frame image has been clearly recognized (YES in step S503), CPU 9 acquires reproduction control information put in correspondence to respective recognized person in the face recognition data (step S504), and then determines whether a reproduction-prohibited position is registered at the current position of the image capturing apparatus positioned by GPS unit 2 (step S505).

If not (NO in step S505), CPU 9 reads an image file F1 from built-in memory 8, produces corresponding image data of YUV type, performs a required resolution conversion process, and then reproduces and displays a resulting image on display 5 (step S56). Then, CPU 9 shifts its processing to step S57 and then repeats step S57 and subsequent steps.

When CPU 9 determines that the reproduction-prohibited position is registered (YES in step S505), CPU 9 shifts its processing to step S57 and then repeats step S57 and subsequent steps without reading image file F1 for reproduction and display.

When a person's face by which the person cannot be identified is detected and reproduction control information corresponding to a different person's face by which this person is identified indicates permission of image reproduction, reproduction of the former person's image may be permitted.

While in embodiment 5 it is illustrated that the face recognition data involving the face recognition process is used as other conditions than the position of the image capturing apparatus, the present invention is not limited to this particular case.

For example, the current date, photographer, image capturing position, image capturing date and image capturing apparatus, information on the subject, and/or a registered name of the user of the image capturing apparatus may be used instead as the other conditions.

While in embodiment 5 the reproduction and display of the image is illustrated as controlled based on the associated face recognition data (which is other condition information) and reproduction control information (involving the reproduction-permitted and -prohibited positions) stored in correspondence to each other in the memory, the present invention is not limited to the particular case.

Alternatively, any one of the reproduction control information and the other condition information for image reproduction may be registered to indicate permission/prohibition of image reproduction.

(Embodiment 6)

Figure 12:
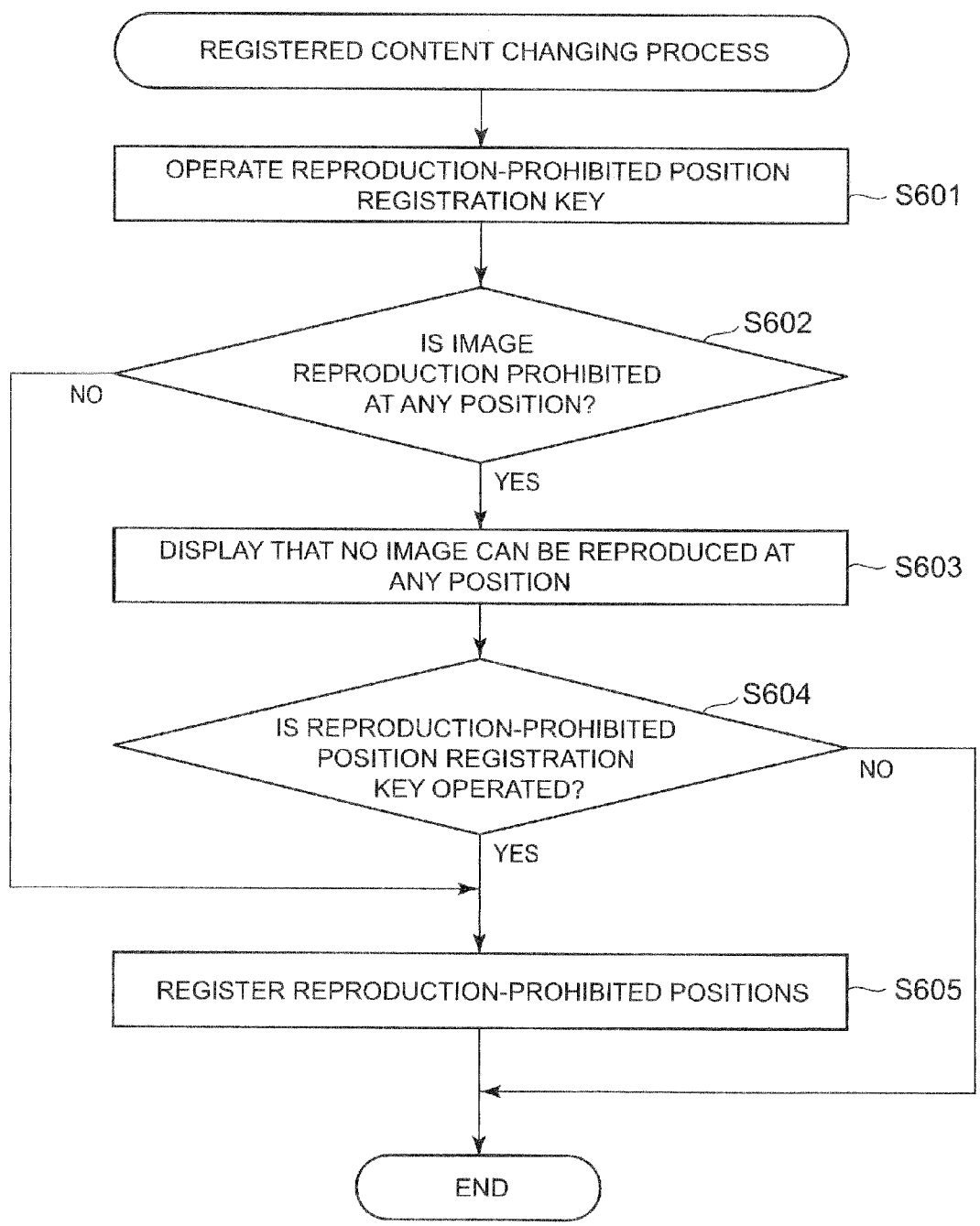
FIG. 12 is a flowchart indicative of one example of a registered content changing process to be performed by an image capturing apparatus of an embodiment 6 according to the present invention.

Referring to FIG. 12, an image capturing apparatus of embodiment 6 will be described. As shown in FIG. 12, when a reproduction-prohibited position is set at each of all positions where reproduction control information is registered in a registered content changing process, the image capturing apparatus restrains registration of the reproduction-prohibited position.

The image capturing apparatus of embodiment 6 is similar in configuration to image capturing apparatus 100 of embodiment 1 excluding the fact that the former performs the registered content changing process, and further description thereof will be omitted.

The program stored in the program memory includes a position determination routine and a change permission routine. The position determination routine is a part of the program which causes CPU 9 to function as position determination means.

This routine includes a group of instructions which requires change of permission/prohibition of reproduction of a target image based on the user's operation performed this time at operator input unit 6, and causes CPU 9 to perform a position determination process including determining whether there is a reproduction-permitted position where reproduction of the target image is permitted in the registration operations performed previously and including the last registration operation.

More specifically, when a registration operation including changing permission of reproduction of an image to prohibition of its reproduction at a reproduction control position is performed by the user's operation at operator input unit 6, CPU 9 determines whether reproduction and display of the target image is impossible at every reproduction control position.

The change permission routine is a part of the program which causes CPU 9 to function as change permission means. This routine includes a group of instructions which when CPU 9 determines that there is at least one reproduction-permitted position for the target image in the position determination process, causes CPU 9 to perform a change permission process which permits changing the permission or prohibition of reproduction of the target image registered in system file F2.

Then, referring to FIG. 12, the registered content changing process will be described. FIG. 12 is a flowchart of one example of the registered content changing process. This process is performed on a displayed image when a registration mode is selected by the user at operator input unit 6 in a state in which the reproduction control information is registered in system file F2.

When a registration operation which includes changing the reproduction-permitted position to the reproduction-prohibited position in the reproduction control information is performed by the user at operator input unit 6 (step S601), the position determination routine causes CPU 9 to determine whether reproduction and display of a target image is prohibited at every reproduction control position (step S602).

If so (YES in step S602), CPU 9 reads from built-in memory 8 display control data on a warning picture (not shown) such as, for example, "No target image will be reproduced at any position, but will you still set a reproduction-prohibited position?" and then displays the warning picture on display 5 (step S603).

Then, CPU 9 determines whether a registration operation for the reproduction-prohibited position has been performed again at operator input unit 6 (step S604). If so (YES in step S604), CPU 9 registers the reproduction control position as the reproduction-prohibited position in system file F2 (step S605).

If not (NO in step S604), CPU 9 determines that no registration operation itself has been performed, thereby terminating the registered content changing process.

When CPU 9 determines in step S602 that reproduction and display of the target image is not prohibited at any reproduction control position (NO in step S602), the change permission routine causes CPU 9 to permit change of permission or prohibition of reproduction of the target image to be registered in system file F2, shifts the processing to step S605 and then performs step S605 and subsequent steps.

While it is illustrated in embodiment 6 that when reproduction and display of the target image is prohibited at every reproduction control position, a predetermined warning picture is displayed and the processing branches to an appropriate step in accordance with the user's operation at operator input unit 6, the present invention is not limited to this particular case.

For example, setting of a reproduction-prohibited position may be prohibited at every position such that reproduction can be performed at that position. In such a case, you may display a reporting picture which prohibits setting of a reproduction-prohibited position such as "No target image can be reproduced at any position and no reproduction-prohibited position can be set", thereby registering no reproduction-prohibited position.

The contents of system files F2 and F3 of embodiment 1-6 are only as an example and the present invention is not limited to these examples.

The embodiments of the image capturing apparatus are also only as an example and the present invention is also not limited to these examples. While the image capturing apparatus is illustrated as the image reproduction apparatus, the present invention is not limited to this particular case.

Arrangement may be such that a plurality of image files produced by image capturing unit 1 are output via communication means to an external device such as a computer, and subjected to the image data registration control process, reproduction control process, registered content changing process, deleted image determination process, deletion restraint process, positioning determination process, reproduction prohibition process, reopening control process, reproduced-image determination process, reopening restraint process, position determination process, change permission process, etc.

In addition, while it is illustrated in the above embodiments that CPU 9 executes respective predetermined programs to perform the corresponding functions of the registration means, reproduction control means, registered content changing means, deleted image determination means, deletion restraint means, positioning determination means, reproduction prohibition means, reopening control means, reproduced image determination means, reopening restraint means, position determination means, and change permission means, the present invention is not limited to these means, but these means each may include a logic circuit (hardware) to perform a respective one of the functions of those means.

Various modifications and changes may be made thereunto without departing from the broad spirit and scope of this invention. The above-described embodiments are intended to illustrate the present invention, not to limit the scope of the present invention. The scope of the present invention is shown by the attached claims rather than the embodiments. Various modifications made within the meaning of an equivalent of the claims of the invention and within the claims are to be regarded to be in the scope of the present invention.

What is claimed is:

1. An image reproduction apparatus comprising:
   an image storage unit that stores a plurality of captured images;
   a positioning unit that registers a current position of the image reproduction apparatus;
   registration means for registering, in a corresponding manner, (i) the plurality of captured images stored in the image storage unit, (ii) a plurality of locations at which reproduction may be performed, and (iii) a plurality of image reproduction control items indicating one of a reproduction permitted state and a reproduction prohibited state for each of the plurality of captured images at each of the plurality of locations;
   reproduction means for reproducing a selected one of the plurality of images stored in the image storage unit; and
   reproduction control means for comparing the current position of the image reproduction apparatus with the plurality of locations registered in the registration means for the selected image, and for controlling the reproduction means to reproduce the selected image in accordance with the reproduction control items for the selected image and a result of the comparison.

2. The image reproduction apparatus of claim 1, further comprising:
   a registration input unit for accepting a user input to arbitrarily set (i) an image to be selected and registered in the registration means from among the plurality of images stored in the image storage unit, and (ii) at least one location at which reproduction may be performed for the selected image, by setting the image reproduction control item to the reproduction permitted state for the at least one location;
   wherein the registration means registers the location set by the registration input unit for the image set by the registration input unit.

3. The image reproduction apparatus of claim 2, wherein, responsive to the registration input unit indicating the location during reproduction of the image, the registration means automatically registers the current position of the image reproduction apparatus, registered by the positioning unit and set by the registration input unit, as the at least one location.

4. The image reproduction apparatus of claim 2, wherein the registration input unit accepts a user input instructing the image reproduction apparatus to select one of (i) a process which permits the reproduction means to reproduce the selected image only at the set position and prohibits the reproduction means from reproducing the selected image at positions other than the set position, (ii) a process which prohibits the reproduction means from reproducing the selected image only at the set position and permits the reproduction means to reproduce the selected image at positions other than the set position, and (iii) a process which prohibits the reproduction means from reproducing the selected image at least at the set position.

5. The image reproduction apparatus of claim 2, wherein:
   the registration input unit accepts a user input instructing the image reproduction apparatus to change a location registered in the registering means at which the reproduction permitted state is set; and
   the image reproduction apparatus further comprises:
   position determination means, responsive to the user input instructing the image reproduction apparatus to change the location, for determining whether there is a second location at which the reproduction permitted state is set; and
   change permission means for (i) when it is determined that the second location exists, controlling the image reproduction apparatus to set the reproduction permitted state for the second position, and (ii) when it is determined that there is no second location at which the reproduction permitted state is set, restraining the image reproduction apparatus from changing the position at which the reproduction permitted state is set.

6. The image reproduction apparatus of claim 1, further comprising:
   deletion input means for instructing the image reproduction apparatus to delete the plurality of images stored in the image storage unit, wherein the positioning unit registers the position of the image reproduction apparatus when the deletion input unit instructs the image reproduction apparatus to delete the plurality of images stored in the image storage unit;

deleted-image determination means for determining whether the plurality of images to be deleted includes an image for which the position of the image reproduction apparatus registered by the positioning unit when the deletion input means has instructed the image reproduction apparatus to delete the plurality of images is registered as a position corresponding to the reproduction prohibited state on the registration means; and deletion restraint means for restraining the image reproduction apparatus from deleting the plurality of images, when the deleted-image determination means determines that the plurality of images to be deleted includes the image.

7. The image reproduction apparatus of claim 6, wherein the deletion restraint means prohibits the image reproduction apparatus from deleting images among the plurality of images set in the reproduction prohibited state and causes the image reproduction apparatus to delete images other than the images set in the reproduction prohibited state.

8. The image reproduction apparatus of claim 1, further comprising position registration determination means for determining whether the positioning means has registered the current position of the image reproduction apparatus;

wherein the reproduction control means controls the reproduction means such that images in the reproduction prohibited state registered in the registering means are not reproduced when the position registration determination means determines that the current position of the image reproduction apparatus has not been positioned.

* * * * *